US011493104B2

(12) United States Patent
Hinata

(10) Patent No.: US 11,493,104 B2
(45) Date of Patent: Nov. 8, 2022

(54) DAMPER MEMBER, DAMPER MECHANISM, ACTUATOR, AND DAMPER MEMBER MANUFACTURING METHOD

(71) Applicant: NIDEC SANKYO CORPORATION, Nagano (JP)

(72) Inventor: Shoji Hinata, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 330 days.

(21) Appl. No.: 16/778,499

(22) Filed: Jan. 31, 2020

(65) Prior Publication Data

US 2020/0248772 A1 Aug. 6, 2020

(30) Foreign Application Priority Data

Jan. 31, 2019 (JP) .............................. JP2019-015588

(51) Int. Cl.
| | | |
|---|---|---|
| *F16F 9/30* | (2006.01) | |
| *B29C 39/12* | (2006.01) | |
| *B29C 35/02* | (2006.01) | |
| *B06B 1/04* | (2006.01) | |
| *H02K 5/24* | (2006.01) | |

(52) U.S. Cl.
CPC .............. *F16F 9/306* (2013.01); *B06B 1/045* (2013.01); *B29C 39/123* (2013.01); *H02K 5/24* (2013.01); *B06B 2201/53* (2013.01); *B29C 35/02* (2013.01); *F16F 2224/0233* (2013.01); *F16F 2226/04* (2013.01); *F16F 2232/08* (2013.01); *F16F 2238/04* (2013.01)

(58) Field of Classification Search
CPC ........ F16F 9/30; F16F 9/306; F16F 2224/048; F16F 2224/0233; F16F 15/04; B06B 1/045; B06B 2201/53; B29C 39/12; B29C 39/123; B29C 39/126; C08J 5/00; C08J 5/12; C08J 5/121
USPC ........................................ 428/446, 447, 448
See application file for complete search history.

(56) References Cited

U.S. PATENT DOCUMENTS

| | | | | | |
|---|---|---|---|---|---|
| 3,160,549 | A | * | 12/1964 | Caldwell ................. | B32B 27/00 244/119 |
| 3,658,635 | A | * | 4/1972 | Eustice ................... | F16F 9/306 181/290 |
| 4,910,060 | A | * | 3/1990 | Nakanishi ............... | B29C 65/18 428/447 |
| 5,213,879 | A | * | 5/1993 | Niwa ................... | G10K 11/168 428/492 |
| 5,336,708 | A | * | 8/1994 | Chen .................... | A61C 15/041 297/394 |
| 5,673,437 | A | * | 10/1997 | Chase .................. | B32B 27/304 2/167 |

(Continued)

FOREIGN PATENT DOCUMENTS

| | | | |
|---|---|---|---|
| JP | 2015085682 | A | 5/2015 |
| JP | 2016127789 | A | 7/2016 |
| KR | 20100083097 | A * | 7/2010 |

*Primary Examiner* — Thomas J Williams
(74) *Attorney, Agent, or Firm* — Cantor Colburn LLP

(57) ABSTRACT

A damper member may include a gel-like member and a first film joined to a first surface of the gel-like member in a thickness direction, in which a side surface of the gel-like member located between a second surface opposite to the first surface of the gel-like member in the thickness direction and the first surface is opened.

4 Claims, 14 Drawing Sheets

(56) References Cited

U.S. PATENT DOCUMENTS

| | | | | |
|---|---|---|---|---|
| 5,942,332 A | * | 8/1999 | Nakamura | C08J 5/00 |
| | | | | 428/447 |
| 6,083,853 A | * | 7/2000 | Fujimoto | B29C 43/28 |
| | | | | 442/37 |
| 6,117,176 A | * | 9/2000 | Chen | A61C 15/041 |
| | | | | 428/319.3 |
| 6,148,830 A | * | 11/2000 | Chen | C08L 51/00 |
| | | | | 524/270 |
| 6,660,203 B1 | * | 12/2003 | Fujimoto | B32B 25/08 |
| | | | | 264/174.11 |
| 2011/0064871 A1 | * | 3/2011 | Uchida | G11B 5/855 |
| | | | | 428/447 |
| 2017/0310203 A1 | * | 10/2017 | Takeda | H02K 33/16 |

* cited by examiner

DAMPER MEMBER, DAMPER MECHANISM, ACTUATOR, AND DAMPER MEMBER MANUFACTURING METHOD

CROSS REFERENCE TO RELATED APPLICATION

The present application claims priority under 35 U.S.C. § 119 to Japanese Application No. 2019-015588 filed on Jan. 31, 2019, the entire content of which is incorporated herein by reference.

BACKGROUND

Field of the Invention

At least an embodiment of the present invention relates to a damper member including a gel-like member, a damper mechanism, an actuator, and a method for manufacturing the damper member.

Description of the Related Documents

As a device for generating vibration by a magnetic drive mechanism, an actuator including a support body configured to hold a coil and a movable body supported by the support body via a damper member is proposed, and a permanent magnet is arranged in the movable body. Further, the actuator is provided with a damper member made of a gel-like member such as silicone gel between the movable body and the support body to prevent resonance generated when the movable body is driven (see Japanese Unexamined Patent Application Publication No. 2016-127789, hereinafter referred to as "Patent Literature 1").

Alternatively, a structure in which a gel-like member is completely covered with two films is proposed (see Japanese Unexamined Patent Application Publication No. 2015-85682, hereinafter referred to as "Patent Literature 2").
[Patent Literature 1]
Japanese Unexamined Patent Application Publication No. 2016-127789
[Patent Literature 2]
Japanese Unexamined Patent Application Publication No. 2015-085682

If the gel-like member such as silicone gel is used as the damper member described in Patent Literature 1, the damper member itself has an adherence property, so that it is not easy to handle the damper member. For example, there is a problem in that if, after the gel-like member is divided on a table, an adhesive head is used to adhere each of the divided gel-like members to convey each of the divided gel-like members from the table, the gel-like members adhere onto the table and cannot be easily conveyed. Alternatively, the structure in which the gel-like member is completely covered with two films as in the configuration described in Patent Literature 2 has a problem in that the gel-like member is deformed and the films are also deformed, and thus, if this structure is used as the damper member described in Patent Literature 1, a resonance frequency is affected by the films, and a damper performance is deteriorated.

In view of the above problems, an object of at least an embodiment of the present invention is to provide a damper member to be easily handled even if a gel-like member is used for suppressing resonance or the like, a damper mechanism therefor, an actuator therefor, and a method for manufacturing the damper member.

SUMMARY

In order to solve the above problem, in one aspect of a damper member according to at least an embodiment of the present invention, the damper member may include a gel-like member and a first film joined to a first surface of the gel-like member in a thickness direction such that a side surface of the gel-like member located between a second surface opposite to the first surface of the gel-like member in the thickness direction and the first surface is opened.

The damper member according to at least an embodiment of the present invention may include a gel-like member and can efficiently absorb vibration by the gel-like member. Moreover, the first film is joined to the gel-like member. Thus, a surface where the first film is joined among a plurality of surfaces of the gel-like member does not have an adherence property, and thus, if the surface where the first film is joined is used as a contact surface with a conveyance member, the damper member can be easily handled during conveyance. Moreover, since the first film is joined to the first surface of the gel-like member so that the side surface of the gel-like member is opened, the first film hardly affects deformation of the gel-like member. Therefore, even if the first film is joined to first surface of the gel-like member, the damper performance of the damper member is not easily deteriorated.

In at least an embodiment of the present invention, an aspect may be employed in which the first film is larger in size than the first surface. According to such an aspect, even if the damper member is bonded to a member via the first film, an adhesive does not easily adhere to the side surface of the gel-like member, and thus, it is possible to suppress deterioration of the damper performance caused due to the adhesive adhering to the side surface of the gel-like member.

In at least an embodiment of the present invention, an aspect may be employed in which the first film has a thickness of 100 μm or less. According to such an aspect, even if the first film is joined to the first surface of the gel-like member, the damper member can be prevented from being thick.

In at least an embodiment of the present invention, an aspect may be employed in which a second film is joined to the second surface of the gel-like member. According to such an aspect, since both surfaces of the damper member do not have an adherence property, the damper member can be easily handled during conveyance.

In at least an embodiment of the present invention, an aspect may be employed in which the second film is larger in size than the second surface. According to such an aspect, even if the damper member is bonded to a member via the second film, an adhesive does not easily adhere to the side surface of the gel-like member, and thus, it is possible to suppress deterioration of the damper performance caused due to the adhesive adhering to the side surface of the gel-like member.

In at least an embodiment of the present invention, an aspect may be employed in which the side surface has a slope allowing a size of the first surface to be different from a size of the second surface. According to such an aspect, when the gel-like member is formed, a mold material and the gel-like member can be easily separated.

In one aspect of a damper mechanism including a damper member according to at least an embodiment of the present invention, the damper mechanism includes a first member and a second member capable of moving relatively to the first member such that in the damper member, the first surface is bonded via the first film to the first member, and the second surface contacts the second member.

In another aspect of a damper mechanism including the damper member according to at least an embodiment of the present invention, the damper mechanism includes a first member and a second member capable of moving relatively to the first member such that in the damper member, the first surface is bonded via the first film to the first member, and the second surface is bonded via the second film to the second member.

In yet another aspect of a damper mechanism including the damper member according to at least an embodiment of the present invention, the damper mechanism includes a first member and a second member capable of moving relatively to the first member such that in the damper member, the first surface is bonded via the first film to the first member, and in the second surface, the second surface of the gel-like member contacts the second member.

In this case, in the damper mechanism according to at least an embodiment of the present invention, an aspect may be employed in which the second surface of the gel-like member closely adheres to the second member by adhesiveness of the gel-like member itself.

Moreover, in the damper mechanism according to at least an embodiment of the present invention, an aspect may be employed in which the second surface of the gel-like member is bonded to the second member.

In one aspect of an actuator including the damper mechanism according to at least an embodiment of the present invention, an aspect may be employed in which the actuator includes a magnetic drive mechanism configured to move the second member relatively to the first member.

In one aspect of a method for manufacturing a damper member according to at least an embodiment of the present invention, the method includes dividing a first large film larger than the first film into the first film, placing a frame unit of a forming mold member over an end of the first film, filling an uncured gel material inside the frame unit, placing a cover member from a side opposite to the first film over the gel material and the frame unit, forming the gel-like member inside a space surrounded by the frame unit, the first film, and the cover member by curing the gel material, and removing the mold member such that the damper member in which the first film is joined to the first surface of the gel-like member is obtained. According to such an aspect, there is no need to perform cutting the gel-like member into a predetermined size. Thus, it is possible to prevent problems in that when the gel-like member is cut, a task efficiency is decreased due to the gel-like member adhering to a cutter, and a dimensional accuracy of the gel-like member is deteriorated.

In the method for manufacturing a damper member according to at least an embodiment of the present invention, an aspect may be employed in which the cover member is a second large film larger in size than the gel-like member, in the removing, the mold member is removed from a side of the first film, and after the removing, the second large film is cut along a position where the frame unit has been located thereby to obtain the gel-like member in which a second film is joined to the second surface opposite to the first surface of the gel-like member in the thickness direction.

In the method for manufacturing a damper member according to at least an embodiment of the present invention, an aspect may be employed in which the cover member is a member configuring a part of the damper mechanism.

In the method for manufacturing a damper member according to at least an embodiment of the present invention, an aspect may be employed in which a side surface of the frame unit is formed to be an inclined surface, and a side surface of the damper member is formed to be a slope.

The damper member according to at least an embodiment of the present invention includes the gel-like member, and the first film is joined to the gel-like member. Thus, a surface where the first film is joined among a plurality of surfaces of the gel-like member does not have an adherence property, and thus, if the surface where the first film is joined is used as a contact surface with a conveyance member, the damper member can be easily handled during conveyance. Moreover, since the first film is joined to the first surface of the gel-like member so that the side surface of the gel-like member is opened, the first film hardly affects deformation of the gel-like member. Therefore, even if the first film is joined to first surface of the gel-like member, the damper performance of the damper member is not easily deteriorated.

BRIEF DESCRIPTION OF THE DRAWINGS

Embodiments will now be described, by way of example only, with reference to the accompanying drawings which are meant to be exemplary, not limiting, and like elements are numbered alike in several Figures, in which.

DETAILED DESCRIPTION

Figure 1:
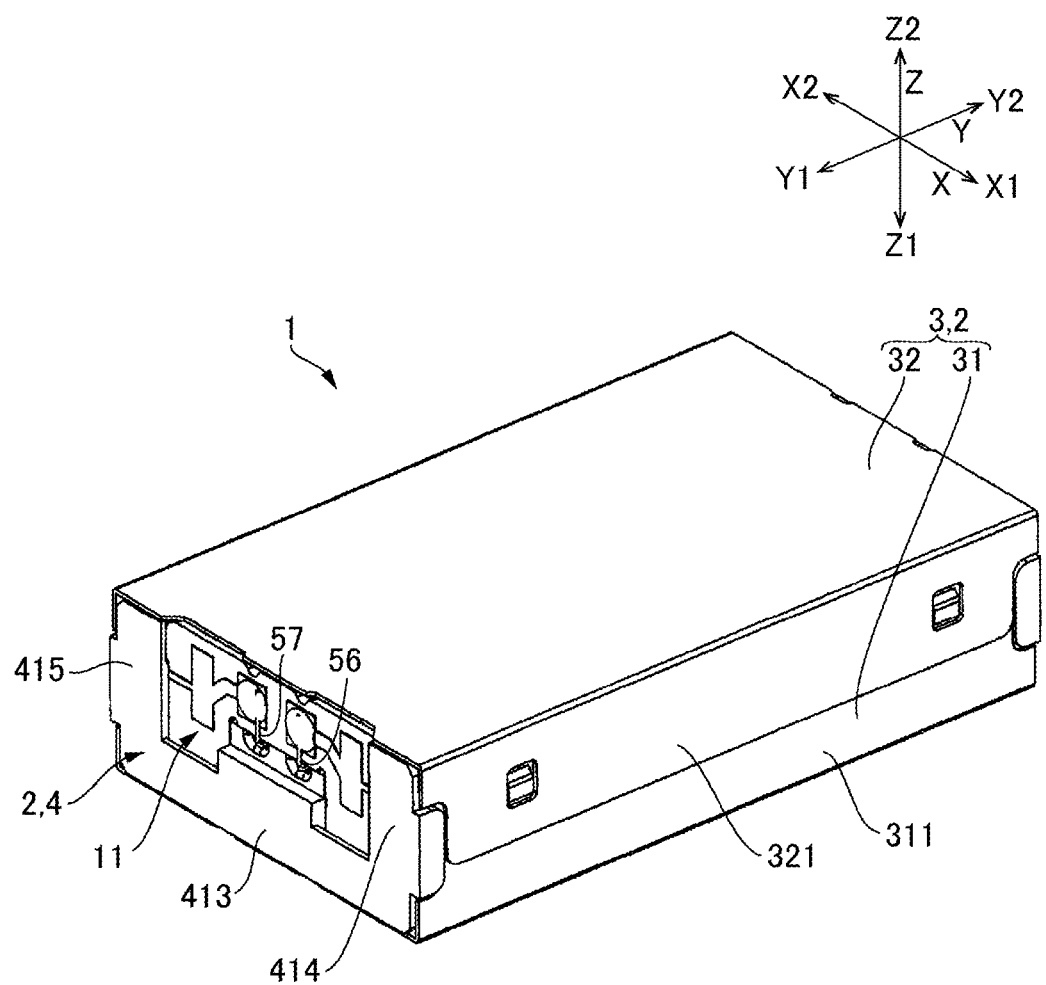
FIG. 1 is a perspective view illustrating one aspect of an actuator according to a first embodiment of the present invention.

With reference to the drawings, a damper member 9, a damper mechanism 10, an actuator 1, and a method of manufacturing the damper member 9 to which at least an embodiment of the present invention is applied are described. In the following description, the damper member 9 employed in the damper mechanism 10 of the actuator 1 will be mainly described. In the damper mechanism 10, the damper member 9 is arranged between a first member and a second member capable of moving relatively to the first member; however, in the following description, a case is mainly described in which the first member is a support body 2 and the second member is a movable body 6. In the actuator 1, a coil is held by one of members, that is, the support body 2 and the movable body 6, and a magnet is held by the other of the members, however, in the following description, a case is mainly described in which the one member configured to hold the coil is the support body 2 and the other member configured to hold a permanent magnet is the movable body 6.

Example of Configuration of Actuator and Damper Mechanism

In the following description regarding an actuator, X is allotted to a linear motion direction (vibration direction) of the movable body 6, Z is allotted to a first direction crossing the second direction X, and Y is allotted to a third direction crossing the first direction Z and the second direction X. Further, in the following description, X1 is allotted to a first side in the second direction X, X2 is allotted to a second side in the second direction X, Z1 is allotted to a first side in the first direction Z, Z2 is allotted to a second side in the first direction Z, Y1 is allotted to a first side in the third direction Y, and Y2 is allotted to a second side in the third direction Y.

Overall Configuration of Actuator 1

Figure 2:
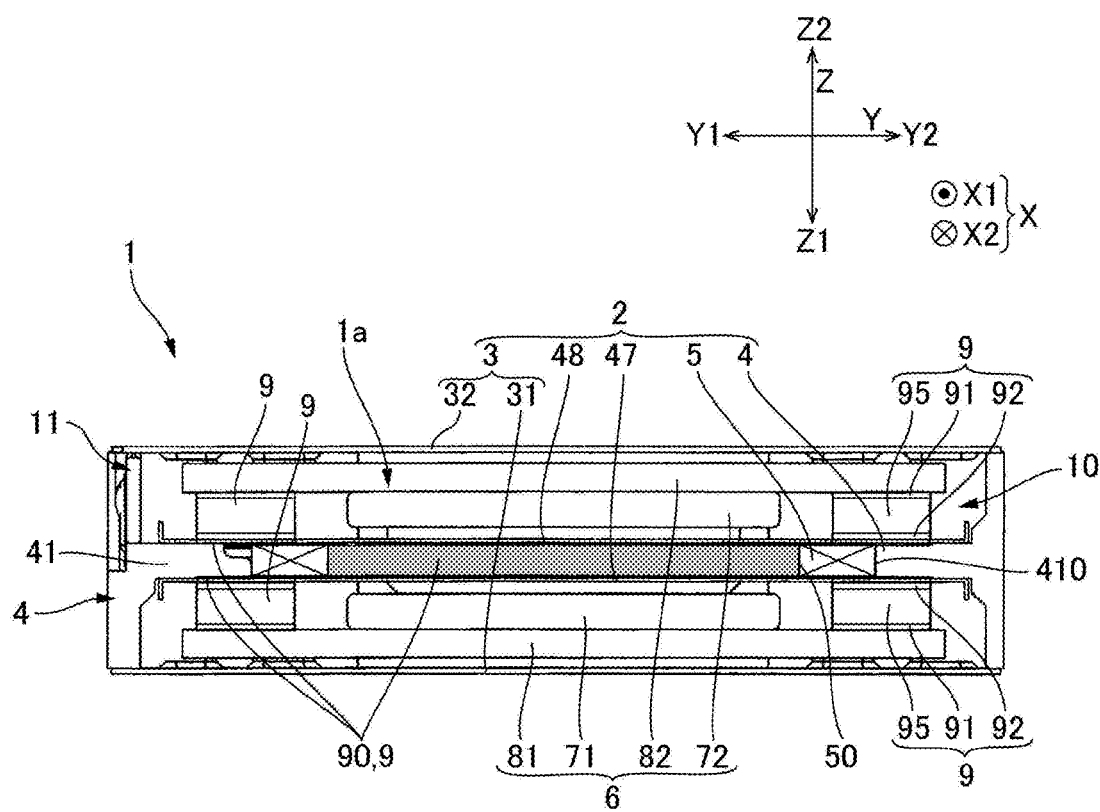
FIG. 2 is a Y-Z cross-sectional view of the actuator illustrated in FIG. 1.
Figure 3:
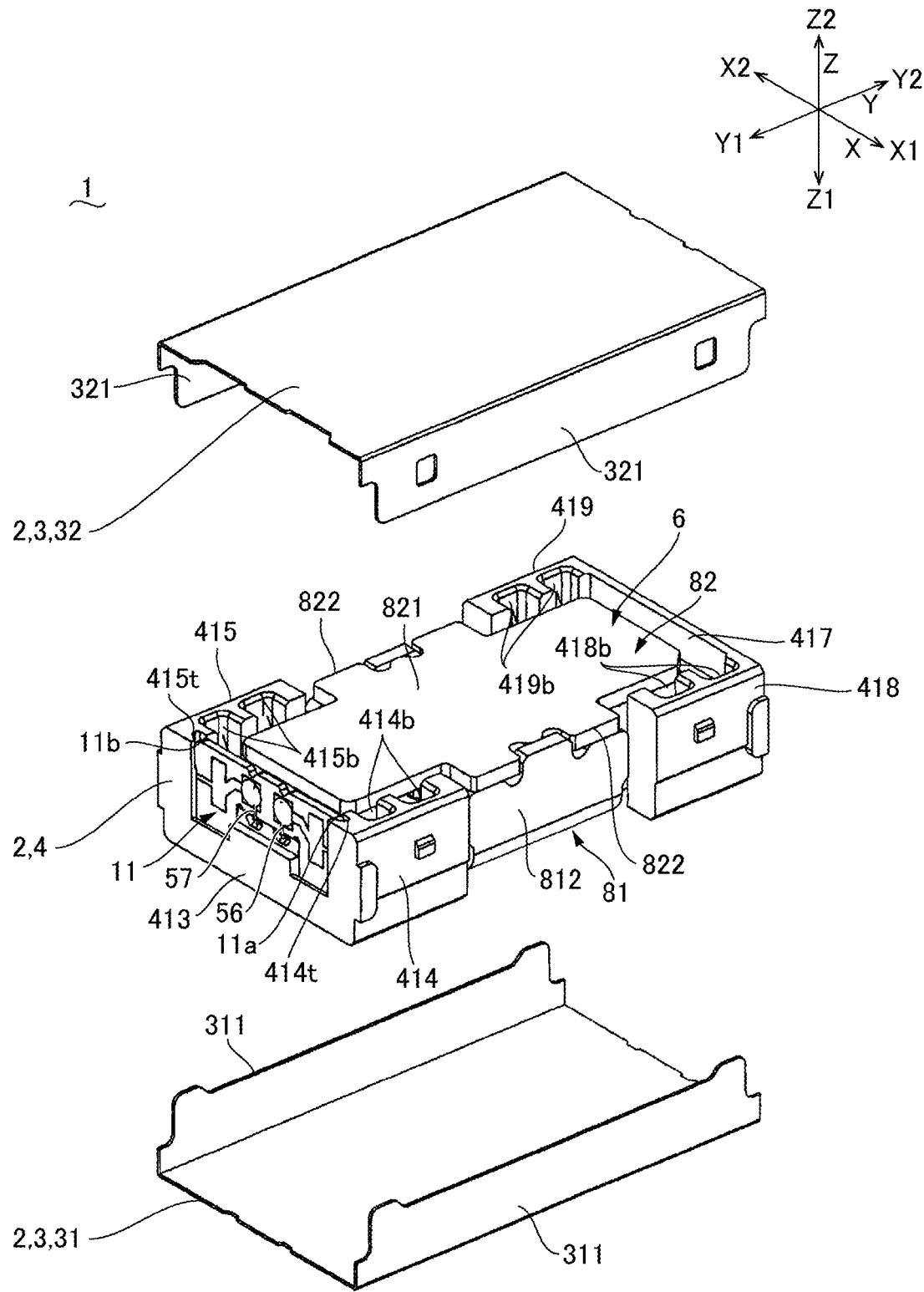
FIG. 3 is an exploded perspective view of the actuator illustrated in FIG. 1.
Figure 4:
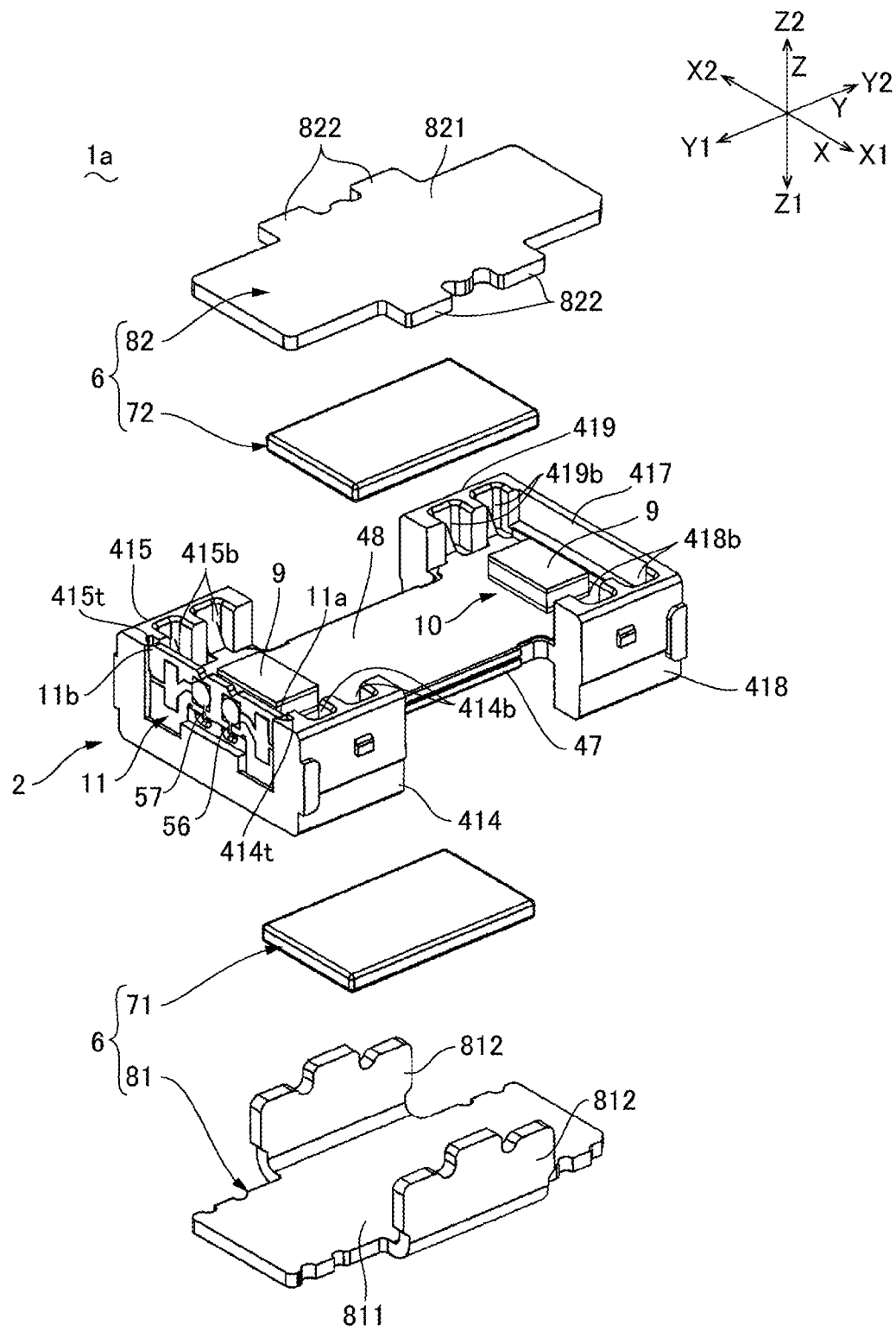
FIG. 4 is an exploded perspective view obtained when the actuator illustrated in FIG. 1 is disassembled into a support body and a movable body.
Figure 5:
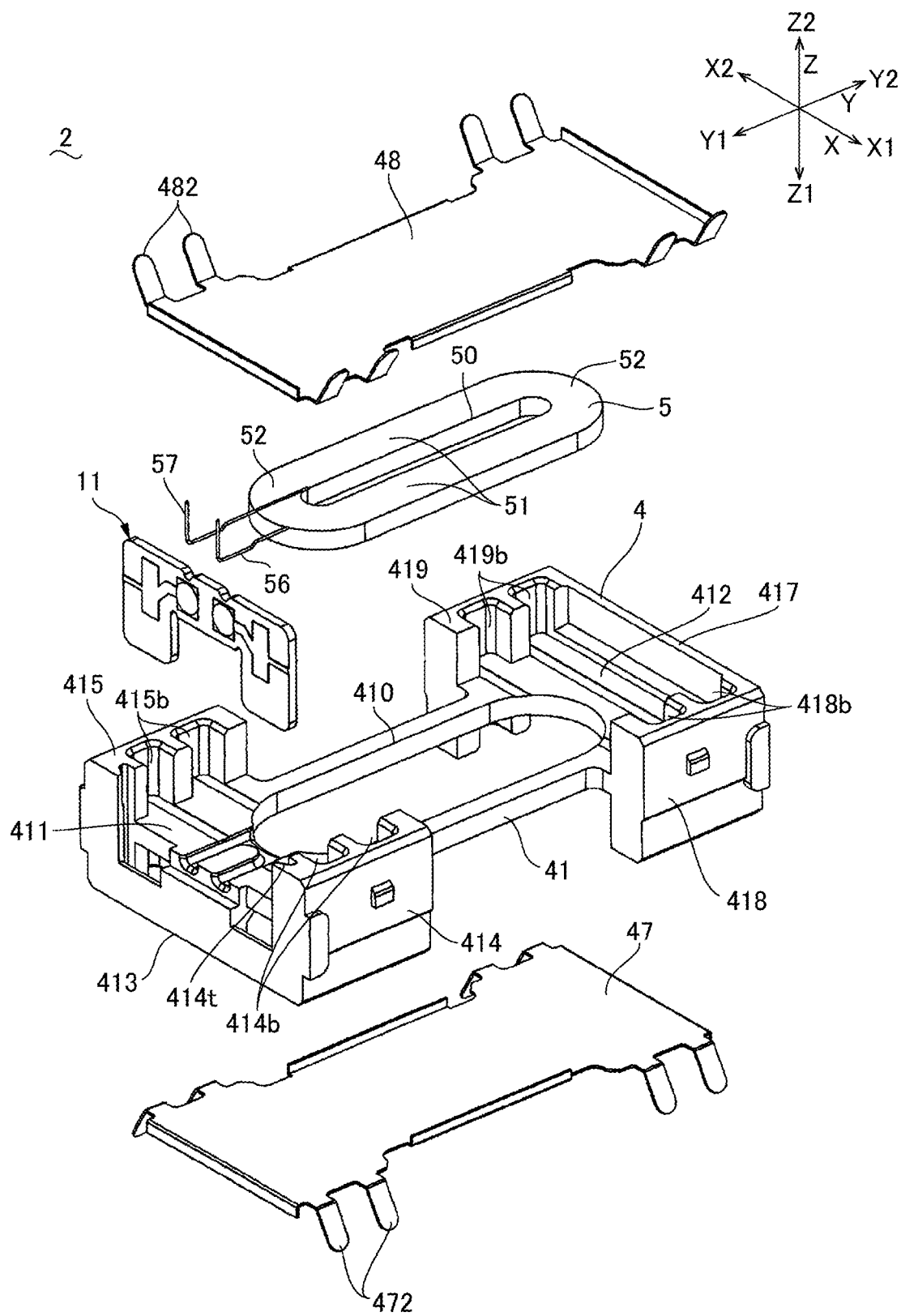
FIG. 5 is an exploded perspective view obtained when the support body illustrated in FIG. 4 is viewed from a second side in a first direction.

FIG. 1 is a perspective view illustrating an aspect of the actuator 1 to which at least an embodiment of the present invention is applied. FIG. 2 is a Y-Z cross-sectional view of the actuator 1 illustrated in FIG. 1. FIG. 3 is an exploded perspective view of the actuator 1 illustrated in FIG. 1. FIG. 4 is an exploded perspective view obtained when the actuator 1 illustrated in FIG. 1 is disassembled into the support body 2 and the movable body 6. FIG. 5 is an exploded perspective view obtained when the support body 2 illustrated in FIG. 4 is viewed from the second side Z2 in the first direction Z.

The actuator 1 illustrated in FIG. 1 notifies a user holding the actuator 1 by a hand, of information by vibration in the second direction X. Therefore, the actuator 1 can be utilized as an operating member of a game machine or the like, and functions as a tactile device allowing a user to experience a new feeling by vibration or the like. However, the application of the actuator 1 is not limited to an information transmission device such as a tactile device.

As illustrated in FIG. 2, FIG. 3, FIG. 4, and FIG. 5, the actuator 1 includes the support body 2 including a rectangular case 3 and the like defining an outer shape of the actuator 1 and the movable body 6 supported, inside the case 3, to be movable relatively to the support body 2 in the second direction X, and in the actuator 1, information is output by the movable body 6 vibrating in the second direction X.

The support body 2 includes the case 3, a coil holder 4, a coil 5, and a power supply substrate 11, and the movable body 6 includes permanent magnets (a first permanent magnet 71 and a second permanent magnet 72), and yokes (a first yoke 81 and a second yoke 82). The coil 5 and the permanent magnets (the first permanent magnet 71 and the second permanent magnet 72) configure a magnetic drive mechanism 1a configured to move the movable body 6 relatively to the support body 2. The movable body 6 is supported by the support body 2 via a damper member 9 provided between the movable body 6 and the support body 2, and the damper member 9 is interposed between the movable body 6 and the support body 2 to configure the damper mechanism 10.

Configuration of Movable Body 6

As illustrated in FIG. 2, FIG. 3, and FIG. 4, the movable body 6 includes the first yoke 81 arranged at the first side Z1 in the first direction Z with respect to the coil 5 and the flat-plate-like first permanent magnet 71 held on a surface at the second side Z2 in the first direction Z of the first yoke 81 to face the coil 5 at the first side Z1 in the first direction Z. In addition, the movable body 6 includes the second yoke 82 arranged at the second side Z2 in the first direction Z with respect to the coil 5 and the flat-plate-like second permanent magnet 72 held on a surface at the first side Z1 in the first direction Z of the second yoke 82 to face the coil 5 at the second side Z2 in the first direction Z. In the present embodiment, the movable body 6 includes the first yoke 81, the first permanent magnet 71, the second yoke 82, and the second permanent magnet 72.

The first yoke 81 includes a flat plate unit 811 to which the first permanent magnet 71 is fixed and a pair of coupling units 812 bent from ends on both sides in the second direction X of the flat plate unit 811 toward the second side Z2 in the first direction Z. The second yoke 82 includes a flat plate unit 821 to which the second permanent magnet 72 is fixed, and includes, somewhere in the third direction Y of the flat plate unit 821, a pair of protrusions 822 protruding toward the first side X1 and the second side X2 in the second direction X. The pair of protrusions 822 are coupled with the pair of coupling units 812 of the first yoke 81 by way of welding, for example. The first permanent magnet 71 and the second permanent magnet 72 are magnetized so that the first side Z1 in the first direction Z and the second side Z2 in the first direction Z have poles different from each other.

Configuration of Support Body 2

As illustrated in FIG. 1 and FIG. 2, in the support body 2, the case 3 includes a first case member 31 positioned at the first side Z1 in the first direction Z and a second case member 32 overlapping with the first case member 31 at the second side Z2 in the first direction Z, and a pair of side plate units 311 arranged on both sides of the first case member 31 in the second direction X are coupled with a pair of side plate units 321 arranged on both sides of the second case member 32 in the second direction X, respectively, to form the case 3. The coil holder 4, the coil 5, and the movable body 6, illustrated in FIG. 2 and FIG. 5, are housed between the first case member 31 and the second case member 32.

As illustrated in FIG. 5, the coil 5 is an air-core coil having an annular planar shape wound in an oval shape, and is held by the coil holder 4. The coil 5 includes two long side units 51 extending in the third direction Y and being in parallel in the second direction X and two arc-shaped short side units 52 connecting both ends of the two long side units 51 in the third direction Y. With respect to the coil 5 thus configured, the long side units 51 face the first permanent magnet 71 at the first side Z1 in the first direction Z and face the second permanent magnet 72 at the second side Z2 in the first direction Z. The coil holder 4 includes a plate unit 41 in which a coil arrangement hole 410 having an oval through hole through which the coil 5 is to be arranged is provided in the first direction Z.

A side plate unit 413 protrudes toward the first side Z1 in the first direction Z from an edge of the plate unit 41 at the first side Y1 in the third direction Y at an end 411 thereof at the first side Y1 in the third direction Y, and side plate units 414 and 415 protrude toward the first side Z1 and the second side Z2 in the first direction Z from an edge thereof at the first side X1 in the second direction X and an edge thereof at the second side X2 in the second direction X. Groove-shaped concave units 414b and 415b extending in the first direction Z are formed at the second side Z2 in the first direction Z with respect to the plate unit 41, of inner surfaces of the side plate units 414 and 415. Similar groove-shaped concave units (not illustrated) are formed at the first side Z1 in the first direction Z with respect to the plate unit 41, of the inner surfaces of the side plate units 414 and 415.

Side plate units 417, 418, and 419 protrude toward the first side Z1 and the second side Z2 in the first direction Z from an edge of the plate unit 41 at the second side Y2 in the third direction Y, an edge thereof at the first side X1 in the second direction X, and an edge thereof at the second side X2 in the second direction X at an end 412 thereof at the second side Y2 in the third direction Y. Groove-shaped concave units 418b and 419b extending in the first direction Z are formed on the second side Z2 in the first direction Z with respect to the plate unit 41, of the inner surfaces of the side plate units 418 and 419. Further, similar groove-shaped concave units (not illustrated) are formed at the first side Z1 in the first direction Z with respect to the plate unit 41, of the inner surfaces of the side plate units 418 and 419.

The side plate units 414 and 415 are formed with slits 414t and 415t. Ends 11a and 11b on both sides of the power supply substrate 11 are held in the slits 414t and 415t. Ends 56 and 57 of coil wires included in the coil 5 are connected by solder or the like to the power supply substrate 11.

Configuration of First Plate 47 and Second Plate 48

As illustrated in FIG. 2, FIG. 4, and FIG. 5, the support body 2 includes a first plate 47 overlapping, from the first side Z1 in the first direction Z, with the coil arrangement hole 410 and the plate unit 41, and the coil 5 is fixed to the first plate 47 and the plate unit 41 by an adhesive 20 filled at least in an air-core unit 50 of the coil 5. Therefore, the coil 5 faces the first permanent magnet 71 in the first direction Z via the first plate 47. Further, the first plate 47 is fixed to the plate unit 41 by the adhesive 20.

Further, the support body 2 includes a second plate 48 overlapping, from the second side Z2 in the first direction Z, with the coil arrangement hole 410 and the plate unit 41, and the coil 5 is fixed to the second plate 48 by the adhesive 20 filled at least in the air-core unit 50 of the coil 5. Therefore, the coil 5 faces the second permanent magnet 72 in the first direction Z via the second plate 48. Further, the second plate 48 is fixed to the plate unit 41 by the adhesive 20.

The first plate 47 and the second plate 48 are made of a nonmagnetic material. In the present embodiment, the first plate 47 and the second plate 48 are made of a metal plate. More specifically, the first plate 47 and the second plate 48 are made of a nonmagnetic stainless plate.

The first plate 47 includes claw-like convex units 472 projecting obliquely from both sides in the second direction X to the first side Z1 in the first direction Z, and the convex units 472 elastically abut against insides of groove-shaped concave units (not illustrated) formed in the side plate units 414, 415, 418, and 419, and are held by the coil holder 4. The second plate 48 includes claw-like convex units 482 projecting obliquely from both sides in the second direction X to the second side Z2 in the first direction Z, and the convex units 482 elastically abut against insides of groove-shaped concave units 414b, 415b, 418B, and 419b formed in the side plate units 414, 415, 418, and 419, and are held by the coil holder 4.

Thus, in the actuator 1 of the present embodiment, the coil 5 is arranged inside the coil arrangement hole 410 penetrating the plate unit 41 of the coil holder 4 in the first direction Z, and the first plate 47 is arranged to overlap, from the first side Z1 in the first direction Z, with the coil arrangement hole 410 and the plate unit 41. As a result, if the adhesive 20 is filled in the air-core unit 50 of the coil 5, the adhesive 20 flows into between the coil 5 and the coil holder 4, between the coil 5 and the first plate 47, and between the first plate 47 and the coil holder 4. Therefore, if the adhesive 20 is cured, the coil 5, the first plate 47, and the coil holder 4 are fixed by the adhesive 20.

Configuration of Damper Mechanism 10

As illustrated in FIG. 2, FIG. 3, FIG. 4, and FIG. 5, the movable body 6 is supported movably in the second direction X and in the third direction Y by the damper member 9 in the damper mechanism 10 arranged between the support body 2 and the movable body 6. Therefore, a plate spring or the like is not provided for movably supporting the movable body 6 in the second direction X and in the third direction Y between the movable body 6 and the support body 2. Therefore, a resonance frequency of the movable body 6 with respect to the support body 2 is controlled by the damper member 9.

The damper member 9 is provided in a portion where the first yoke 81 and the first plate 47 face each other in the first direction Z. The damper member 9 is provided in a portion where the second yoke 82 and the second plate 48 face each other in the first direction Z. Therefore, the movable body 6 can be supported movably in the second direction X without using a plate-shaped spring or the like. In the present embodiment, the damper member 9 has a plate-like shape. More specifically, the damper member 9 has a flat plate-like shape.

Detailed Configuration of Damper Member 9

Figure 6:
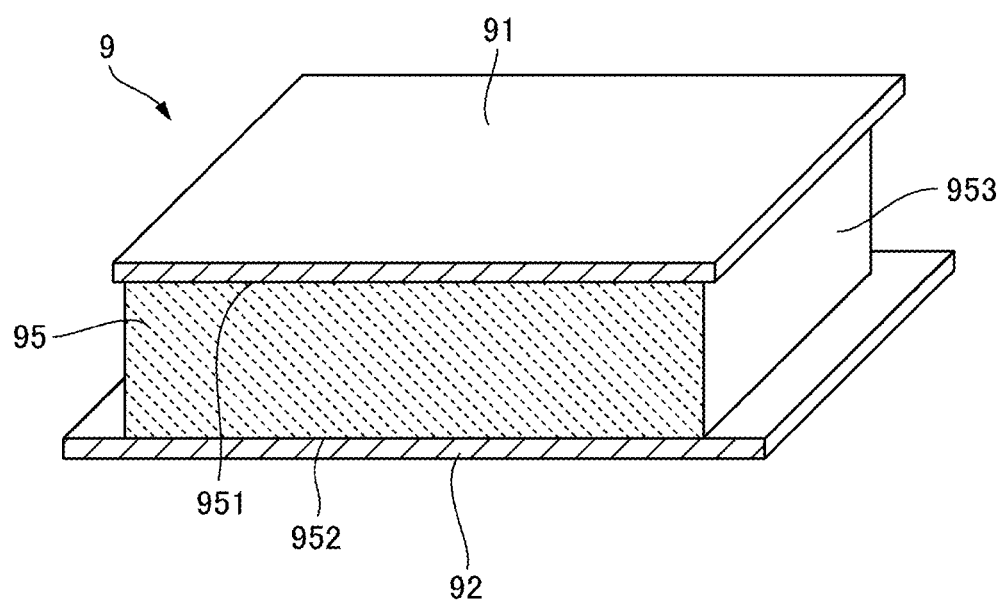
FIG. 6 is an explanatory diagram illustrating a state in which a part of a damper member illustrated in FIG. 2 and the like is cut.

FIG. 6 is an explanatory diagram illustrating a state in which a part of the damper member 9 illustrated in FIG. 2 and the like is cut. As illustrated in FIG. 6, the damper member 9 includes a gel-like member 95 and a first film 91 joined to a first surface 951 of the gel-like member 95 in a thickness direction. In the present embodiment, the damper member 9 further includes a second film 92 joined to a second surface 952 at an opposite side in the thickness direction to the first surface 951 of the gel-like member 95. Here, the first film 91 is joined only to the first surface 951 of the gel-like member 95, and the second film 92 is joined only to the second surface 952 of the gel-like member 95, and thus, a side surface 953 located between the first surface 951 and the second surface 952 in the gel-like member 95 is opened.

The first surface 951 of the damper member 9 is fixed, with an adhesive, to one (a first member) of the support body 2 and the movable body 6 via the first film 91, and the second surface 952 of the damper member 9 is fixed, with an adhesive, to the other (a second member) of the support body 2 and the movable body 6 via the second film 92. The damper member 9 is arranged between the movable body 6 and the support body 2 with the gel-like member 95 being compressed in the thickness direction. The damper member 9 illustrated in FIG. 6 has a rectangular plate shape, but may be a polygon other than a rectangle, or may be a circle.

The gel-like member 95 is made of silicone gel or the like. For example, the gel-like member 95 is silicone gel whose base polymer is organopolysiloxane. The gel-like member 95 is made of, for example, silicone gel having the penetration of 90 to 110 degrees. The penetration means a depth obtained when a ¼ cone needle with a total load of 9.38 g at 25° C. sinks into a material in five seconds, the penetration is a value expressed in units of ¹⁄₁₀ mm, as specified in JIS-K-2207 and JIS-K-2220, and the smaller the value, the harder the material.

Each of the first film 91 and the second film 92 is made of a plastic film, a metal film, a laminated film of a metal film and a plastic film, for example, and is thinner than the gel-like member 95. Each of the first film 91 and the second film 92 has flexibility, and is joined to the gel-like member 95 when the gel-like member 95 is formed. A film made of polyethylene terephthalate, acrylic resin, polyetheretherketone, or the like can be used for a plastic film included in the first film 91 and the second film 92.

Each of the first film 91 and the second film 92 has a thickness of, for example, 100 μm or less. The first film 91 and the second film 92 are preferably thinner, the first film 91 and the second film 92 are preferably 50 μm or less in thickness, and more preferably, 25 μm or less in thickness. In the present embodiment, the first film 91 and the second film 92 have a thickness of 12 μm or less. Therefore, even if the first film 91 and the second film 92 are joined to the gel-like member 95, it is possible to suppress the damper member 9 from being thick. Further, in a manufacturing process described later with reference to FIG. 7 to FIG. 10, it is possible to prevent a case where when the gel-like member 95 is removed from a mold member 100, the first film 91 is caught by a frame unit 110 so that the gel-like member 95 cannot be easily extracted or the gel-like member 95 is damaged.

In the damper member 9, the first film 91 is larger in size than the first surface 951 of the gel-like member 95, and the end of the first film 91 projects from the side surface 953 of the gel-like member 95 over a whole circumference. The second film 92 is larger in size than the second surface 952 of the gel-like member 95, and the end of the second film 92 projects from the side surface 953 of the gel-like member 95 over a whole circumference. Thus, even if the damper member 9 is bonded to the first member (for example, the support body 2) via the first film 91, the adhesive hardly adheres to the side surface 953 of the gel-like member 95. Further, even if the damper member 9 is bonded to the second member (for example, the movable body 6) via the second film 92, the adhesive hardly adheres to the side surface 953 of the gel-like member 95. Further, when the first film 91 is formed to be larger in size than the first surface 951, in the manufacturing process described later with reference to FIG. 7 to FIG. 10, it is possible to prevent the frame unit 110 from being mounted to be shifted from the end of the first film 91 when the mold member 100 is placed over a first large film 910. Thus, when a first support sheet 96 or the mold member 100 is removed, it is possible to prevent the gel-like member 95 from being damaged.

Operation

If power is fed from outside (a higher device) to the coil 5 via the power supply substrate 11 in the actuator 1 according to the present embodiment, the movable body 6 reciprocates in the second direction X by the magnetic drive mechanism 1a including the coil 5, the first permanent magnet 71, and the second permanent magnet 72. Therefore, a user holding the actuator 1 by a hand can obtain information by way of vibration from the actuator 1. At that time, a frequency of a signal waveform to be applied to the coil 5 is changed depending on information to be transmitted, for example. Further, a polarity of a signal waveform to be applied to the coil 5 is reversed, and in this case, a voltage is changed either gradually or steeply depending on a period during which the polarity of a drive signal is negative and a period during which the polarity of the drive signal is positive. This provides a difference between an acceleration achieved when the movable body 6 moves to the first side X1 in the second direction X and an acceleration achieved when the movable body 6 moves to the second side X2 in the second direction X. Therefore, the user can feel an illusion as if the actuator 1 moves toward the first side X1 or the second side X2 in the second direction X.

Moreover, since the damper member 9 provided with the gel-like member 95 is provided between the movable body 6 and the support body 2, it is possible to prevent the movable body 6 from resonating. Here, the damper members 9 are arranged at positions where the support body 2 and the movable body 6 face each other in the first direction Z crossing the second direction X (vibration direction), and thus, if the movable body 6 vibrates in the second direction X, the gel-like member 95 deforms in a shear direction of the gel-like member 95 to prevent the movable body 6 from resonating. Thus, even if the movable body 6 vibrates in the second direction X, a change in an elastic modulus of the gel-like member 95 is small, and thus, it is possible to effectively prevent the movable body 6 from resonating. That is, the gel-like member 95 is a viscoelastic member and has linear or non-linear stretch characteristics depending on a stretch direction of the gel-like member 95. For example, when the gel-like member 95 is pressed in a thickness direction (axial direction) to be compressively deformed, the gel-like member 95 has a stretch characteristic where a non-linear component is larger than a linear component (spring coefficient), and when the gel-like member 95 is extended by being pulled in the thickness direction (axial direction), the gel-like member 95 has a stretch characteristic where the linear component (spring coefficient) is larger than the non-linear component (spring coefficient). Further, when the gel-like member 95 is deformed in a direction (shear direction) crossing the thickness direction (axial direction), the gel-like member 95 is deformed in a direction where the gel-like member 95 is pulled and extended in whichever direction the gel-like member 95 moves, and in this case, the gel-like member 95 has a deformation characteristic where the linear component (spring coefficient) is larger than the non-linear component (spring coefficient). In the present embodiment, when the movable body 6 vibrates in the second direction X, the gel-like member 95 is configured to be deformed in the shear direction. Therefore, in the gel-like member 95, when the movable body 6 vibrates in the second direction X, a spring force according to the movement direction is constant. Therefore, when a spring element in the shear direction of the gel-like member 95 is employed, a reproducibility of a vibration acceleration for an input signal can be improved to achieve the vibration with subtle nuances.

Method of Manufacturing Damper Member 9

FIG. 7, FIG. 8, FIG. 9, and FIG. 10 are each flowchart illustrating, in cross-sectional view, a method of manufacturing the damper member 9 illustrated in FIG. 6. It is noted that in FIG. 7 to FIG. 10, the damper member 9 is approximately the same when viewed from a direction perpendicular to each other.

Figure 7:
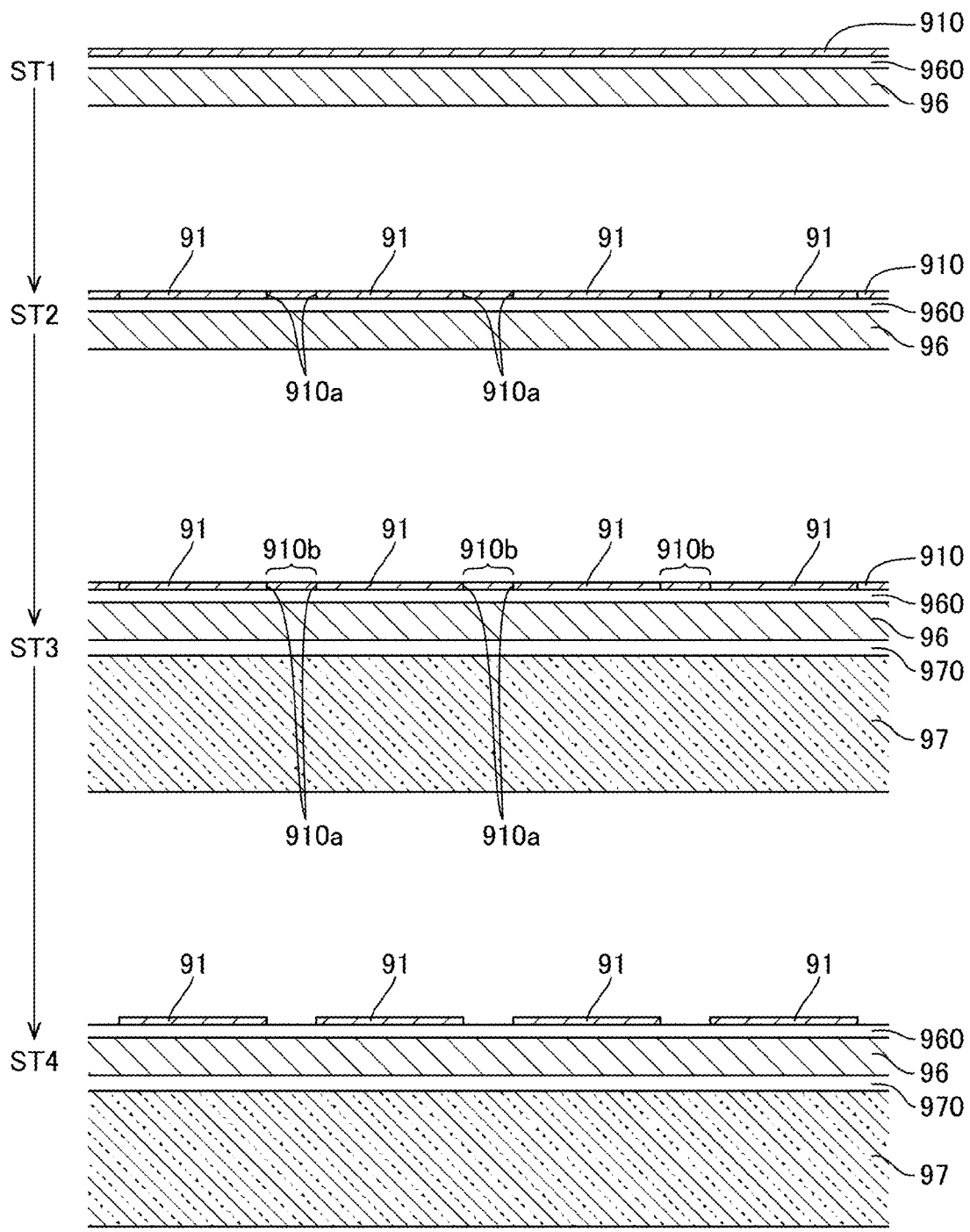
FIG. 7 is a flowchart illustrating, in cross-sectional view, a method of manufacturing the damper member illustrated in FIG. 6.

In manufacturing the damper member 9 illustrated in FIG. 6, in step ST1 illustrated in FIG. 7, the first large film 910 larger than the first film 91 is fixed via a UV curable first gluing agent 960 to a first surface of a first support sheet 96. The first support sheet 96 is, for example, a resin sheet made of polyethylene terephthalate or the like.

Next, in step ST2 (first step), cut lines 910a are provided in the first large film 910 in two directions perpendicular to each other by a cutter (not illustrated) to divide the first large film 910 into a plurality of first films 91.

Next, in step ST3, the first support sheet 96 is fixed to a first support plate 97 such as a glass substrate via a UV curable second gluing agent 970. Next, in step ST4, a boundary unit 910b interposed by the cut lines 910a between the adjacent first films 91, in the first large film 910, is removed. However, the boundary unit 910b may be left intact.

Figure 8:
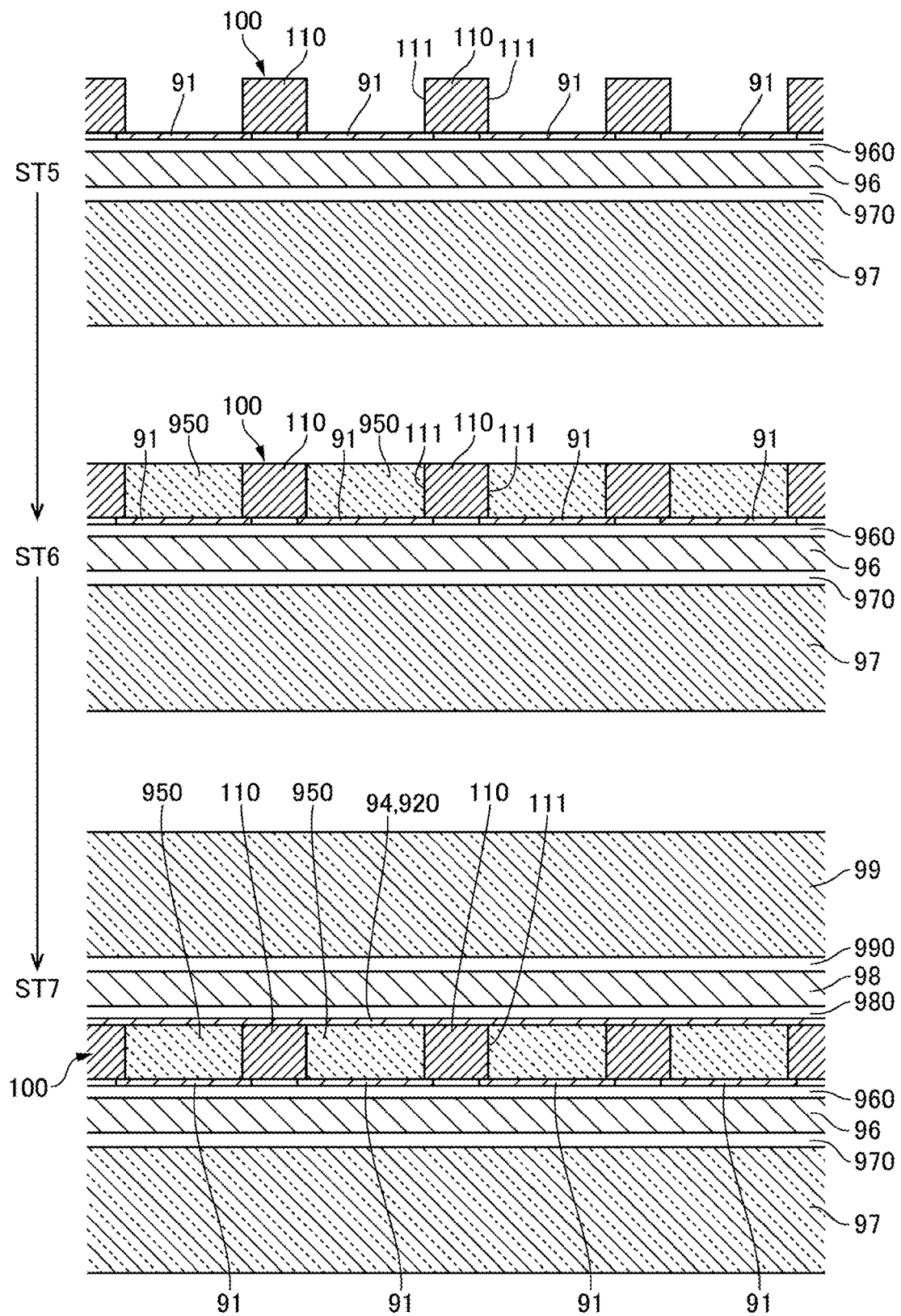
FIG. 8 is a flowchart illustrating, in cross-sectional view, the method of manufacturing the damper member illustrated in FIG. 6.

Next, in step ST5 (second step) illustrated in FIG. 8, the frame unit 110 of the forming mold member 100 is placed over the end (cut line 910a) of the first film 91. In this state, a side surface 111 of the frame unit 110 overlaps with the first film 91 in the vicinity of the end of the first film 91.

Next, in step ST6 (third step), an uncured gel material 950 is filled inside the frame unit 110. The gel material 950 is, for example, a two-liquid mixing type and has room temperature curability. In the present embodiment, for example, addition reaction type silicone gel is employed as the gel material 950, but condensation reaction type silicone gel can also be employed.

Next, in step ST7 (fourth steps), a cover member 94 is placed, from an opposite side of the first film 91, over the gel material 950 and the frame unit 110 to tightly adhere the gel material 950 to the cover member 94. In the present embodiment, the cover member 94 is a second large film 920 larger in size than the gel-like member 95. In the present embodiment, after the second large film 920 is placed over the gel material 950 and the frame unit 110, a second support sheet 98 is fixed via a UV curable third gluing agent 980 to the second large film 920, and further, a second support plate 99 such as a glass substrate is fixed, via a UV curable fourth gluing agent 990, to the second support sheet 98. The second support sheet 98 is, for example, a resin sheet made of polyethylene terephthalate or the like. In step ST7, a member to which the second large film 920, the second support sheet 98, and the second support plate 99 are fixed via the third gluing agent 980 and the fourth gluing agent 990 is made in advance, and the member may be placed from an opposite side of the first film 91 over the gel material 950 and the frame unit 110.

Figure 9:
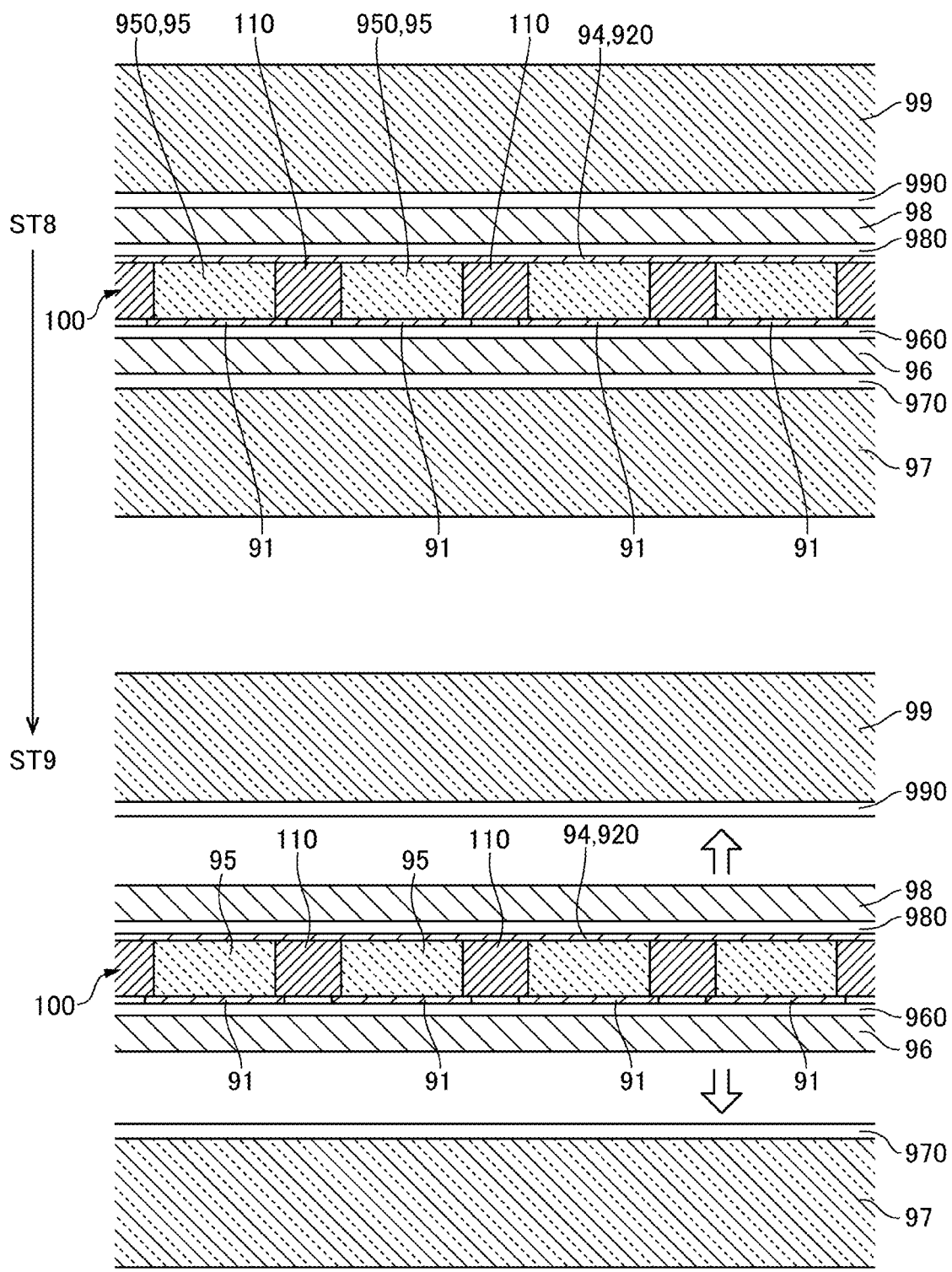
FIG. 9 is a flowchart illustrating, in cross-sectional view, the method of manufacturing the damper member illustrated in FIG. 6.

Next, in step ST8 (fifth step) illustrated in FIG. 9, the gel material 950 is cured to form the gel-like member 95 in a space surrounded by the frame unit 110, the first film 91, and the cover member 94 (second large film 920). In the present embodiment, the gel material 950 contains a silicone polymer having an active group such as a silanol group, and a crosslinking agent for crosslinking the silicone polymer by using the active group, and the crosslinking agent crosslinks the silicone polymer to cure the gel material 950 and to bond the gel-like member 95 to the first film 91 and the second film 92. Although the gel material 950 can be cured at room temperature, in the present embodiment, the gel material 950 is heated to promote curing.

Next, in step ST9, the first support plate 97 and the second support plate 99 are removed. In the present embodiment, after the fourth gluing agent 990 is irradiated with UV or the like to reduce an adhesive strength of the fourth gluing agent 990, the second support plate 99 is removed, and after the second gluing agent 970 is irradiated with UV to reduce an adhesive strength of the second gluing agent 970, the first support plate 97 is removed.

Figure 10:
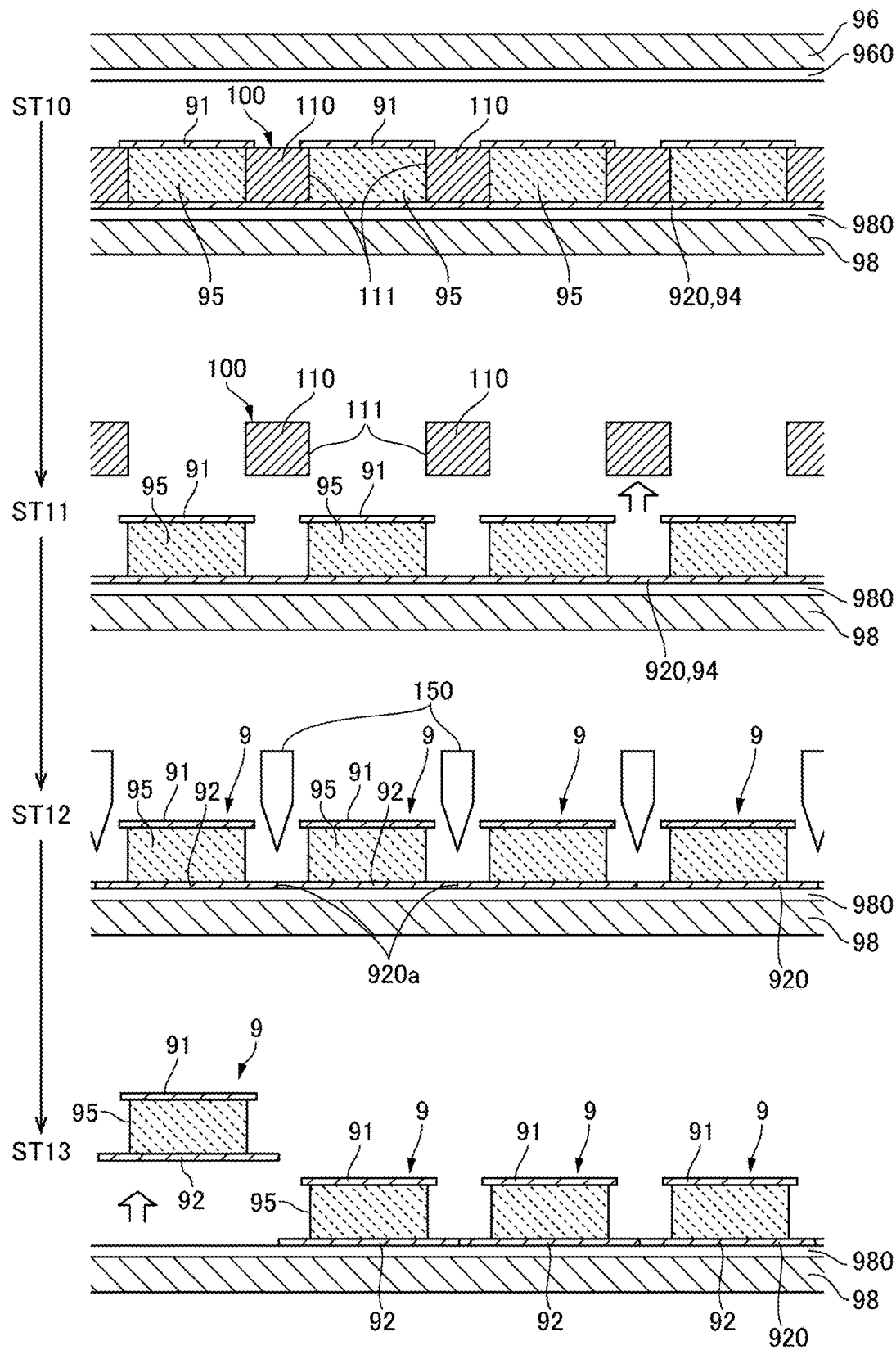
FIG. 10 is a flowchart illustrating, in cross-sectional view, the method of manufacturing the damper member illustrated in FIG. 6.

Next, in step ST10 (fifth step) illustrated in FIG. 10, the first support sheet 96 and the second support sheet 98 are vertically inverted, and then, the first support sheet 96 is removed. In the present embodiment, after the first gluing agent 960 is irradiated with UV to reduce an adhesive strength of the first gluing agent 960, the first support sheet 96 is removed.

Next, in step ST11 (sixth step), the mold member 100 is removed from the side of the first film 91. At that time, since the frame unit 110 of the mold member 100 deforms the end protruding from the gel-like member 95, out of the first film 91, it is possible to remove the mold member 100 without applying a large load to a joint surface between the first film 91 and the gel-like member 95. Further, as described below, the side surface 111 of the frame unit 110 is an inclined surface and a width of the frame unit 110 is reduced as a distance from the first film 91. Thereby, when the mold member 100 is removed from the side of the first film 91, a wider part of the frame unit 110 is firstly removed, and thus, it is possible to remove the mold member 100 without applying a large load to the joint surface between the first film 91 and the gel-like member 95.

Next, in step ST12, a cutter 150 provides a cut line 920a in the second large film 920 along a position where the frame unit 110 was located to cut the second large film 920. As a result, the second large film 920 is divided into a plurality of second films 92. Accordingly, the damper member 9 is manufactured in which the first film 91 is joined to the first surface 951 of the gel-like member 95 and the second film 92 is joined to the second surface 952 of the gel-like member 95.

Next, in step ST13, when an adhesive head (not illustrated) is used to adhere the side of the second film 92 after the third gluing agent 980 is irradiated with UV or the like to reduce an adhesive force of the third gluing agent 980, the damper member 9 can be conveyed while the adhesive head does not contact the gel-like member 95. It is noted that if a slightly adhesive type gluing agent is used as the first gluing agent 960, the second gluing agent 970, the third gluing agent 980, and the fourth gluing agent 990, it is possible to peel off the tightly adhering films or the like by the gluing agents without the UV irradiation or the like.

Main Effect of Present Embodiment

As described above, according to the damper member 9, the damper mechanism 10, the actuator 1, and the method for manufacturing the damper member 9 of the present embodiment, it is possible to efficiently absorb vibration by the gel-like member 95 because the damper member 9 includes the gel-like member 95.

Here, the first film 91 is joined to the first surface 951 of the gel-like member 95, and the second film 92 is joined to the second surface 952 of the gel-like member 95. Thus, the damper member 9 is not easily bent excessively due to its own weight or the like when the actuator 1 is assembled. Of the plurality of surfaces of the gel-like member 95, the surfaces on which the first film 91 and the second film 92 are joined (the first surface 951 and the second surface 952) do not have an adherence property (adhesiveness), and thus, the damper member can be easily handled during conveyance if the surface on which the first film 91 or the second film 92 is joined is used as a contact surface with a conveyance member.

Further, since the gel-like member 95 is formed inside the frame unit 110 of the mold member 100, there is no need to perform a step of cutting the gel-like member 95. Therefore, a problem can be prevented that the gel-like member 95 adheres to a cutter to decrease the precision in a cutting dimension of the gel-like member 95 and a cutting shape thereof. A problem can be also prevented that the gel-like member 95 closely contacts the adjacent gel-like member 95 after being cut by the cutter, and is handled with difficulty during conveyance.

Further, the first film 91 and the second film 92 are joined to the first surface 951 and the second surface 952 of the gel-like member 95 so that the side surface 953 of the gel-like member 95 is opened, and thus, do not easily affect deformation of the gel-like member 95. Therefore, even if the first film 91 and the second film 92 are joined to the gel-like member 95, a damper performance of the damper member 9 is hardly lowered.

Further, in the damper mechanism 10 and the actuator 1, the first film 91 and the second film 92 in the damper member 9 are bonded to the movable body 6 and the support body 2, respectively. Thus, even if the gel-like member 95 has a tendency not to bond to another member, the damper member 9 can be easily bonded. Here, the first film 91 is larger in size than the first surface 951 of the gel-like member 95, and the end of the first film 91 projects from the side surface 953 of the gel-like member 95 over a whole circumference. The second film 92 is larger in size than the second surface 952 of the gel-like member 95, and the end of the second film 92 projects from the side surface 953 of the gel-like member 95 over a whole circumference. Thus, even if the damper member 9 is bonded to a member via the first film 91, the adhesive does not easily adhere to the side surface 953 of the gel-like member 95. Further, even if the damper member 9 is bonded to a member via the second film 92, the adhesive does not easily adhere to the side surface 953 of the gel-like member 95. Therefore, it is possible to prevent a case where due to the adhesive adhering to the side surface of the gel-like member 95, a hardness (penetration) of the side surface 953 of the gel-like member 95 is changed to lower the damper performance.

First Modification of Present Invention

Figure 11:
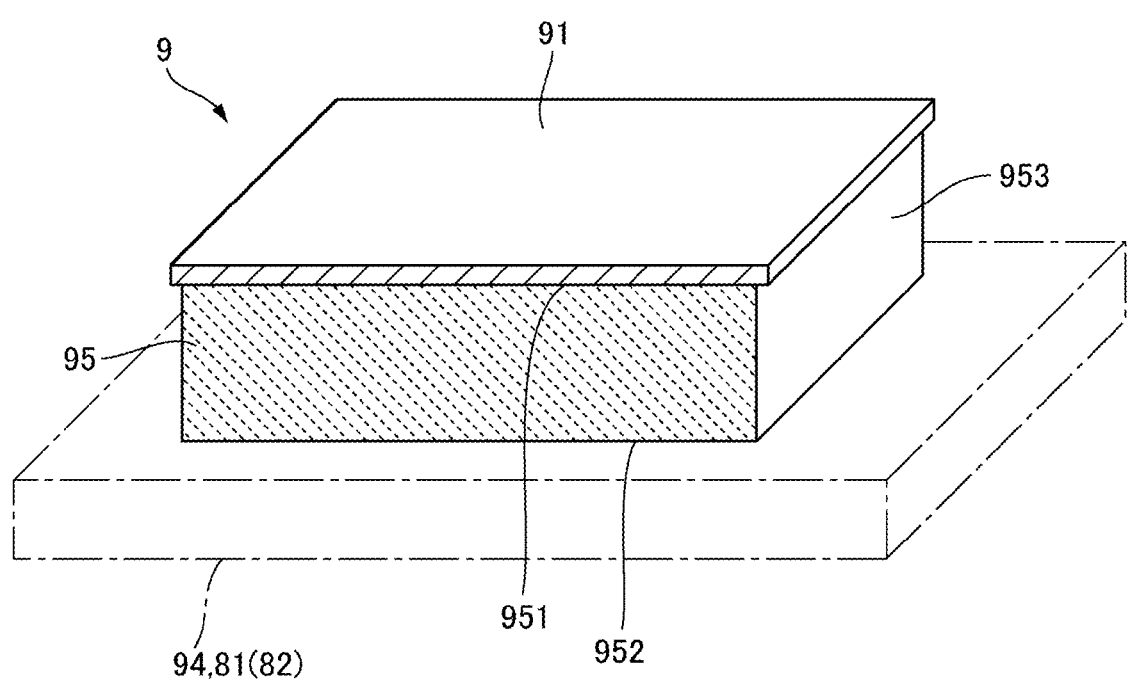
FIG. 11 is an explanatory diagram of a damper member according to a first modification of the embodiment of the present invention.

FIG. 11 is an explanatory diagram of the damper member 9 according to a first modification of the embodiment of the present invention. It is noted that since basic configurations of the first modification and below-described second, third, and fourth modifications are similar to that in the first embodiment, the corresponding parts are denoted by the same reference numerals and the description thereof is omitted. In the damper member 9 according to the embodiment described with reference to FIG. 1 to FIG. 10, the first film 91 and the second film 92 are joined to the both surfaces of the gel-like member 95. On the other hand, in the present modification, as illustrated in FIG. 11, the first film 91 is joined to the first surface 951 of the gel-like member 95, but the second film 92 is not joined to the second surface 952. In this case, the first surface 951 of the gel-like member 95 is bonded to the first member (for example, the support body 2) of the damper mechanism 10 via the first film 91.

On the other hand, an aspect may be employed in which the second surface 952 of the gel-like member 95 is bonded to the second member (for example, the movable body 6) of the damper mechanism 10 by the adhesiveness of the gel-like member 95 itself. Specifically, in step ST7 illustrated in FIG. 8, when the cover member 94 is placed over the gel material 950 and the frame unit 110, if a member (the first yoke 81 or the second yoke 82 of the movable body 6) included in the damper mechanism 10 is placed as the cover member 94, the second surface 952 of the gel-like member 95 can be bonded to the movable body 6 when the gel-like member 95 is formed.

Second Modification of Present Invention

Figure 12:
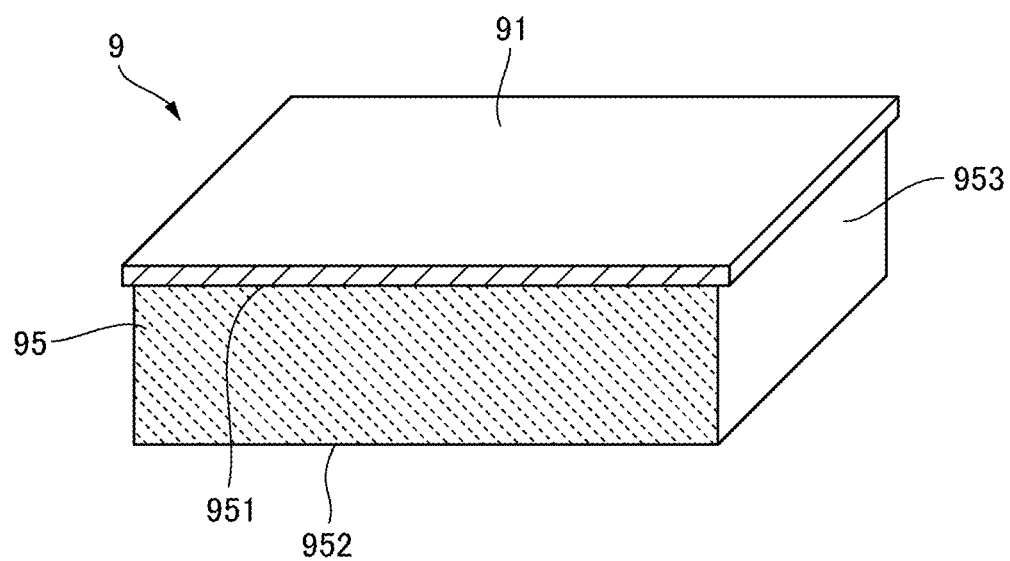
FIG. 12 is an explanatory diagram of a damper member according to a second modification of the embodiment of the present invention.

FIG. 12 is an explanatory diagram of the damper member 9 according to the second modification of the embodiment of the present invention. In the present modification, as illustrated in FIG. 12, the first film 91 is joined to first surface 951 of the gel-like member 95, but the second film 92 is not joined to the second surface 952. In this case, the first surface 951 of the gel-like member 95 is bonded to the first member (for example, the support body 2) of the damper mechanism 10 via the first film 91, and the second surface 952 of the gel-like member 95 is bonded to the second member (for example, the movable body 6) of the damper mechanism 10.

For example, the damper member 9 having such a configuration can be manufactured as follows: for example, after in step ST7 illustrated in FIG. 8, a sheet made of resin such as fluororesin having a high release property is used as the cover member 94 to form the gel-like member 95, the gel-like member 95 is removed from the cover member 94 while the mold member 100 is removed in the step ST11 illustrated in FIG. 10.

Third Modification of Present Invention

Figure 13:
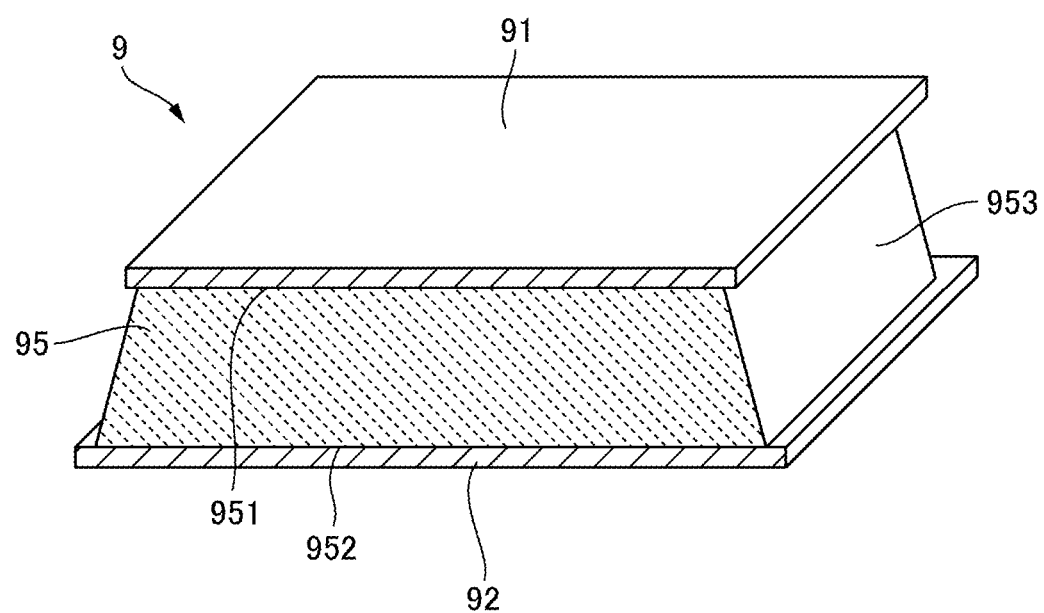
FIG. 13 is an explanatory diagram of a damper member according to a third modification of the embodiment of the present invention.

FIG. 13 is an explanatory diagram of the damper member 9 according to the third modification of the embodiment of the present invention. In the above-described embodiment and the like, the both surfaces (the first surface 951 and the second surface 952) of the gel-like member 95 have the same size. On the other hand, in the present modification, the side surface 111 of the frame unit 110 illustrated in FIG. 8 or the like is an inclined surface to facilitate the removal of the frame unit 110. More specifically, a width of the frame unit 110 is reduced as a distance from the first film 91 increases. As a result, as illustrated in FIG. 13, the side surface 953 of the gel-like member 95 is a slope allowing the size of the first surface 951 to be different from the size of the second surface 952. In the present modification, the side surface 953 is inclined so that a distance between the side surfaces 953 is smaller from the second surface 952 to the first surface 951 to ensure that the second surface 952 is larger in size than the first surface 951.

Fourth Modification of Present Invention

Figure 14:
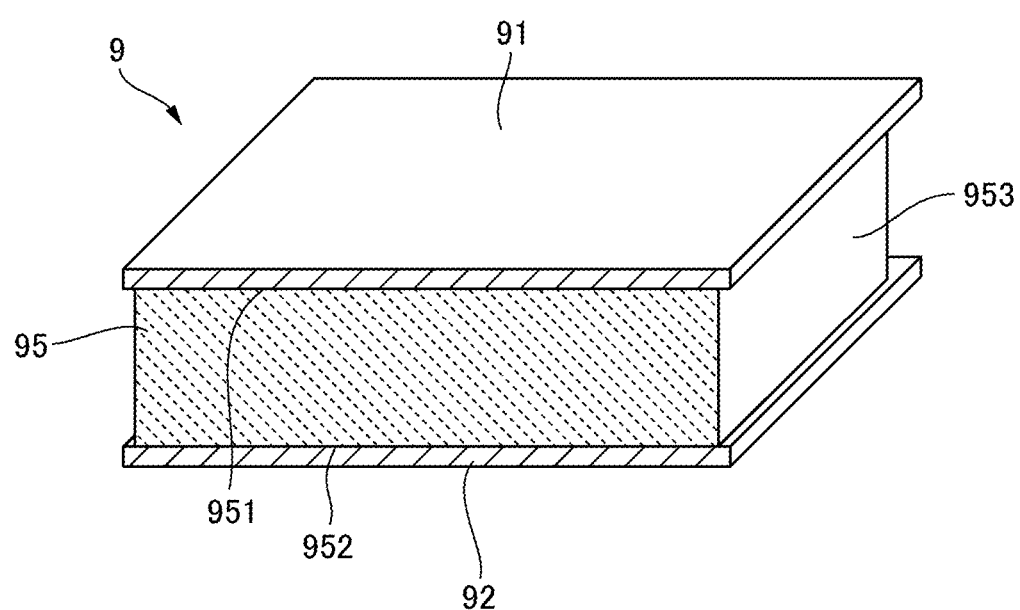
FIG. 14 is an explanatory diagram of a damper member according to a fourth modification of the embodiment of the present invention.

FIG. 14 is an explanatory diagram of the damper member 9 according to the fourth modification of the embodiment of the present invention. In the above-described embodiment and the like, the first film 91 is smaller in size than the second film 92 because the boundary unit 910*b* is removed in step ST3 illustrated in FIG. 7. On the other hand, in the present modification, in step ST3 illustrated in FIG. 7, one cut line 910*a* is provided between the adjacent first films 91, and the boundary unit 910*b* is not removed. Thus, as illustrated in FIG. 14, the size of the first film 91 is equal to the size of the second film 92.

Another Embodiment

In the damper mechanism 10 and the actuator 1 according to the above embodiments, in the damper member 9, the first surface 951 of the gel-like member 95 is coupled to the support body 2 (first member) and the second surface 952 is coupled to the movable body 6 (second member), but at least an embodiment of the present invention may be applied if the movable body 6 is the first member and the support body 2 is the second member. In this case, the first surface 951 of the gel-like member 95 is coupled to the movable body 6 (first member), and the second surface 952 is coupled to the support body 2 (second member).

In the damper mechanism 10 and the actuator 1 according to the above embodiments, an aspect is employed in which the damper member 9 is fixed to the movable body 6 and the support body 2 by being bonded or joined thereto, however, for example, an aspect may be employed in which the gel-like member 95 is placed, in a state of being compressed in a through-thickness direction, between the movable body 6 and the support body 2, and by using its reaction force, the damper member 9 contacts the movable body 6 and the support body 2.

In the actuator 1 according to the above embodiments, the coil is held on the support body 2, and the permanent magnet is held on the movable body 6, but at least an embodiment of the present invention may be applied to a case where the permanent magnet is held on the support body 2, and the coil is held on the movable body 6.

In the above embodiments, at least an embodiment of the present invention is applied to the actuator 1 in which the movable body 6 vibrates in one direction, but at least an embodiment of the present invention may be applied to an actuator in which the movable body 6 vibrates in two directions crossing each other.

In the above embodiments, the damper member 9 is provided in the actuator 1, but at least an embodiment of the present invention may be applied to the damper member 9 arranged between a movable body and a support body in a device other than the actuator 1. Moreover, in the above embodiments, the damper member 9 is provided to contact both the movable body 6 and the support body 2, but at least an embodiment of the present invention may be applied to the damper member 9 provided to contact the movable body 6 only. In this case, in the damper member 9, a film is joined to the surface at a side of the movable body of the gel-like member 95, and the damper member 9 is provided so that the film contacts the movable body. Moreover, the film may be bonded to the movable body.

In the above embodiments, although silicone gel is employed for the gel-like member 95, at least an embodiment of the present invention may be applied to a case where another gel is employed therefor.

In the above embodiments, description is provided where a planar shape of the frame unit 110 of the mold member 100 is a rectangle as an example, but the planar shape of the frame unit 110 is not limited to a rectangle and a circular shape, an elliptical shape, a polygonal shape, and any other shapes may be applied.

What is claimed is:

1. A method for manufacturing a damper member comprising a gel member and a first film joined to a first surface of the gel member in a thickness direction wherein a side surface of the gel member located between a second surface opposite to the first surface of the gel member in the thickness direction and the first surface is opened, the method comprising:
    dividing a first large film larger than the first film into the first film;
    placing a frame unit of a forming mold member over an end of the first film;
    filling an uncured gel material inside the frame unit;
    placing a cover member from a side opposite to the first film over the gel material and the frame unit;
    forming the gel member inside a space surrounded by the frame unit, the first film, and the cover member by curing the gel material; and
    removing the mold member, wherein the damper member in which the first film is joined to a first surface of the gel member.

2. The method for manufacturing the damper member according to claim 1, wherein
    the cover member is a second large film larger in size than the gel member,
    in the removing, the mold member is removed from a side of the first film, and
    after the removing, the second large film is cut along a position where the frame unit has been located thereby to obtain the gel member in which a second film is joined to the second surface opposite to the first surface of the gel member in the thickness direction.

3. The method for manufacturing the damper member according to claim 1, wherein
    the cover member is a member configuring a part of the damper mechanism.

4. The method for manufacturing the damper member according to claim 1, wherein
    a side surface of the frame unit is formed to be an inclined surface, and
    a side surface of the damper member is formed to be a slope.

* * * * *